(12) United States Patent
Feng et al.

(10) Patent No.: US 8,015,680 B2
(45) Date of Patent: Sep. 13, 2011

(54) PRESSING APPARATUS AND METHOD

(75) Inventors: Hong-Jun Feng, Shenzhen (CN); Peng Zhang, Shenzhen (CN); Yu-Bin Guo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 286 days.

(21) Appl. No.: 12/475,582

(22) Filed: May 31, 2009

(65) Prior Publication Data

US 2010/0269324 A1    Oct. 28, 2010

(30) Foreign Application Priority Data

Apr. 25, 2009  (CN) .................. 2009 1 0301843.4

(51) Int. Cl.
*B23P 23/00*  (2006.01)
*B23P 15/00*  (2006.01)

(52) U.S. Cl. .............. 29/33 K; 29/700; 29/509; 29/513; 29/896.2; 29/243.5; 29/566; 72/314

(58) Field of Classification Search .................. 29/33 K, 29/565, 566, 50, 700, 509, 513, 896.2, 281.1, 29/255, 244, 280, 243.5, 243.57, 243.58; 72/312, 314
See application file for complete search history.

(56) References Cited

U.S. PATENT DOCUMENTS

| | | | | |
|---|---|---|---|---|
| 1,757,385 A * | 5/1930 | Preator et al. | ................... | 29/700 |
| 2,710,041 A * | 6/1955 | Stanbery | ........................ | 72/314 |
| 3,328,869 A * | 7/1967 | Lannert | ...................... | 29/897.15 |
| 5,247,825 A * | 9/1993 | Erickson | .......................... | 29/6.1 |
| 5,652,413 A * | 7/1997 | Mulera | ......................... | 181/141 |
| 2003/0226388 A1 * | 12/2003 | Matsuoka | ....................... | 72/314 |

FOREIGN PATENT DOCUMENTS

JP      01-311800 A  * 12/1989
JP      2004-017871 A * 1/2004

* cited by examiner

*Primary Examiner* — Erica E Cadugan
(74) *Attorney, Agent, or Firm* — Altis Law Group, Inc.

(57) ABSTRACT

A pressing apparatus is used to press a number of hooks of a speaker mesh to a shell. The pressing apparatus includes a workbench, a first pressing board located above the workbench, a number of bending members extending down from the first pressing board, a second pressing board located above the first pressing board, and a number of pressing members extending down from the second pressing board and slidably passing through the first pressing board. The number of bending members press inner sides of distal ends of the hooks to bend out in response to the first pressing board moving towards the workbench; and the number of pressing members press the distal ends of the hooks to bend further to hold the shell in response to the second pressing board moving towards the workbench.

7 Claims, 3 Drawing Sheets

PRESSING APPARATUS AND METHOD

BACKGROUND

1. Technical Field

The present disclosure relates to pressing apparatuses and methods, and particularly to a pressing apparatus and a method for bending hooks of a speaker mesh to a shell of an audio playing device.

2. Description of Related Art

Generally, an audio playing device, such as a computer, a television set, a radio, a stereo etc., includes a speaker for converting electrical signals into sounds loud enough to be heard at a distance. The speaker includes a shell body and a speaker mesh fixed to the shell body.

Normally, the shell body includes a plurality of clamping slots, and the speaker mesh includes a plurality of hooks passed through the clamping slots. Generally, the hooks are manually pressed to perpendicularly bend to hold the shell body, for fixing the speaker mesh to the shell body. However, it is quite inconvenient and inefficient to manually press the plurality of hooks to the shell body, and in this process, the operators can easily become tired and can be hurt by the hooks. Moreover, manually positioning the hooks can be inaccurate and some hooks may be missed and not even fixed to the shell body.

DETAILED DESCRIPTION

Figure 1:
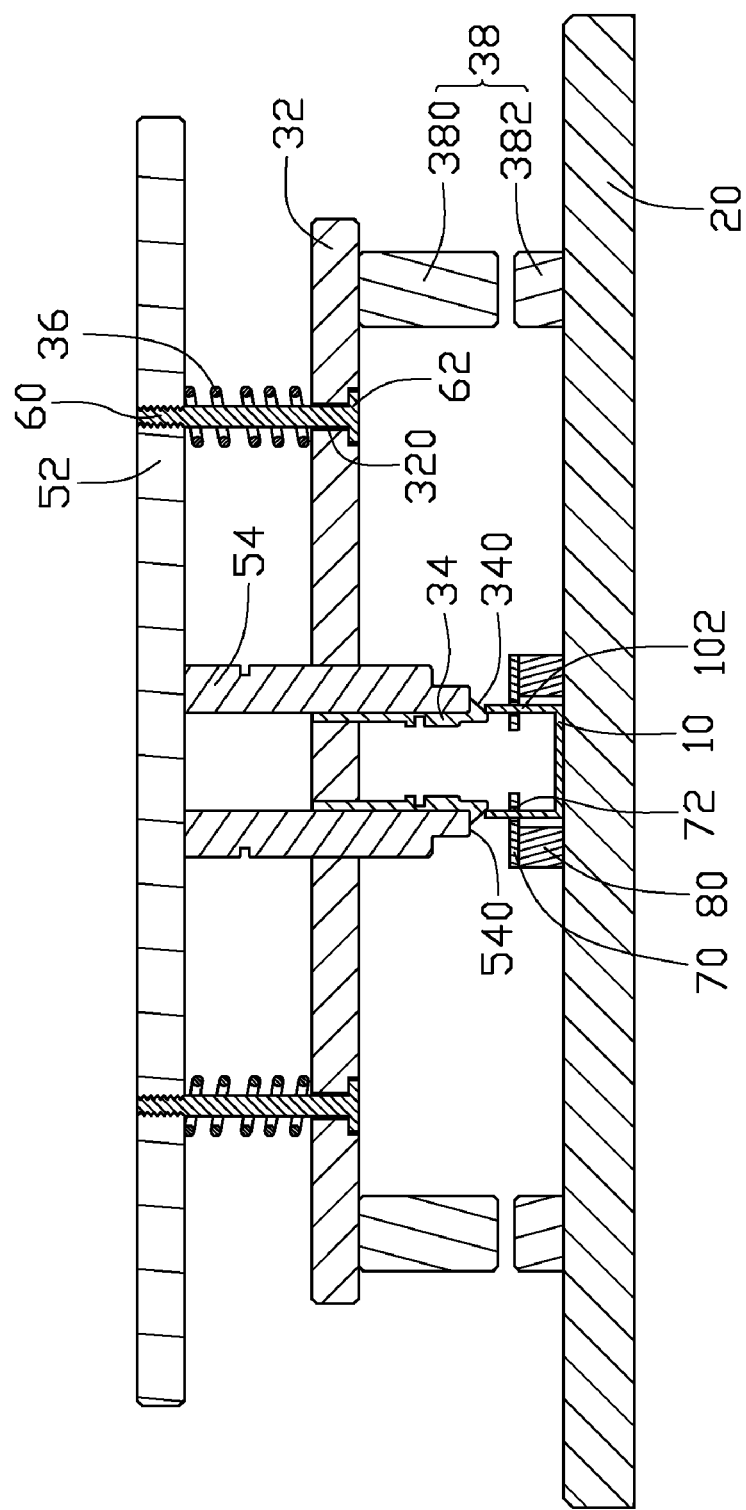
FIG. 1 is a schematic diagram of an exemplary embodiment of a pressing apparatus, together with a speaker mesh and a shell of an audio playing device.

Referring to FIG. 1, an exemplary embodiment of a pressing apparatus is used for pressing a plurality of hooks 102 of a speaker mesh 10 to perpendicularly bend to hold a shell 70 of an audio playing device (not shown), such as an earphone. The pressing apparatus includes a workbench 20, a first pressing board 32, a plurality of bending members 34 corresponding to the plurality of hooks 102, a plurality of resilient members 36, a limiting unit 38, a second pressing board 52, a plurality of pressing members 54, and a plurality of connecting members 60. In the embodiment, the plurality of resilient members 36 are a plurality of coil springs.

The shell 70 defines a plurality of clamping slots 72 corresponding to the hooks 102, to allow the hooks 102 to pass therethrough.

The limiting unit 38 includes a plurality of resisting posts 380 extending down from a first surface of the first pressing board 32, and a plurality of withstanding posts 382 extending up from a top surface of the workbench 20, to resist against the plurality of resisting posts 380 respectively.

The workbench 20 is used to support the speaker mesh 10 and the shell 70. A positioning member 80 extends up from the top surface of the workbench 20, for supporting the shell 70 and positioning the speaker mesh 10. The withstanding posts 382 are located around the positioning member 80.

The first pressing board 32 is located above the workbench 20 and hung from the second pressing board 52, with the first surface facing the top surface of the workbench 20. The first pressing board 32 defines a plurality of through holes (not labeled) in a center of the first pressing board 32, and a plurality of stepped holes 320 adjacent to sides of the first pressing board 32. Each stepped hole 320 includes a greater portion through the first surface, and a smaller portion communicating with the greater portion and through a second surface opposite to the first surface of the first pressing board 32.

Each bending member 34 extends down from a center of the first surface of the first pressing board 32, adjacent to a corresponding through hole of the first pressing board 32. Each bending member 34 includes a slanting bending end 340 facing a corresponding hook 102, at a distal end of the bending member 34. In the embodiment, each bending end 340 slants 45 degrees relative to the first surface of the first pressing board 32.

The second pressing board 52 located above the first pressing board 32 can be driven by a driving unit (not shown), such as, a punch, an air cylinder, or a hydraulic cylinder etc. The second pressing board 52 includes a first surface facing the second surface of the first pressing board 32, and defines a plurality of positioning holes (not labeled) corresponding to the plurality of stepped holes 320. In the embodiment, the positioning holes are screw holes, and the first pressing board 32 also can be driven by a driving unit (not shown), such as, a punch, an air cylinder, or a hydraulic cylinder etc.

Each pressing member 54 perpendicularly extends downwards from the first surface of the second pressing board 52. Each pressing member 54 can be slidably passed through a corresponding through hole of the first pressing board 32, and adjacent to a corresponding bending member 34. Each pressing member 54 includes a flat pressing surface 540 at a distal end of the pressing member 54.

Each connecting member 60 includes a greater head portion 62, and a shaft extending from the head portion 62. A threaded portion is formed on a distal end of the shaft, opposite to the head portion 62. In assembly, the resilient members 36 are located between the first and second pressing boards 32, 52, aligning with the corresponding stepped holes 320 of the first pressing board 32 and the positioning holes of the second pressing board 52. The shafts of the connecting members 60 are slidably passed through the corresponding stepped holes 320 of the first pressing board 32, and the corresponding resilient members 36, to engage with the corresponding positioning holes of the second pressing board 52. Opposite ends of each resilient member 36 resist against the first and second pressing boards 32, 52, respectively. The head portions 62 of the connecting members 60 are detachably accommodated in the greater portions of the corresponding stepped holes 320. Therefore, the plurality of resilient members 36 are compressively deformed between the first and second pressing boards 32, 52, and the head portions 62 of the connecting members 60 resist against bottom walls of the greater portions of the corresponding stepped holes 320 in response to the deformation of the resilient members 36.

Figure 2:
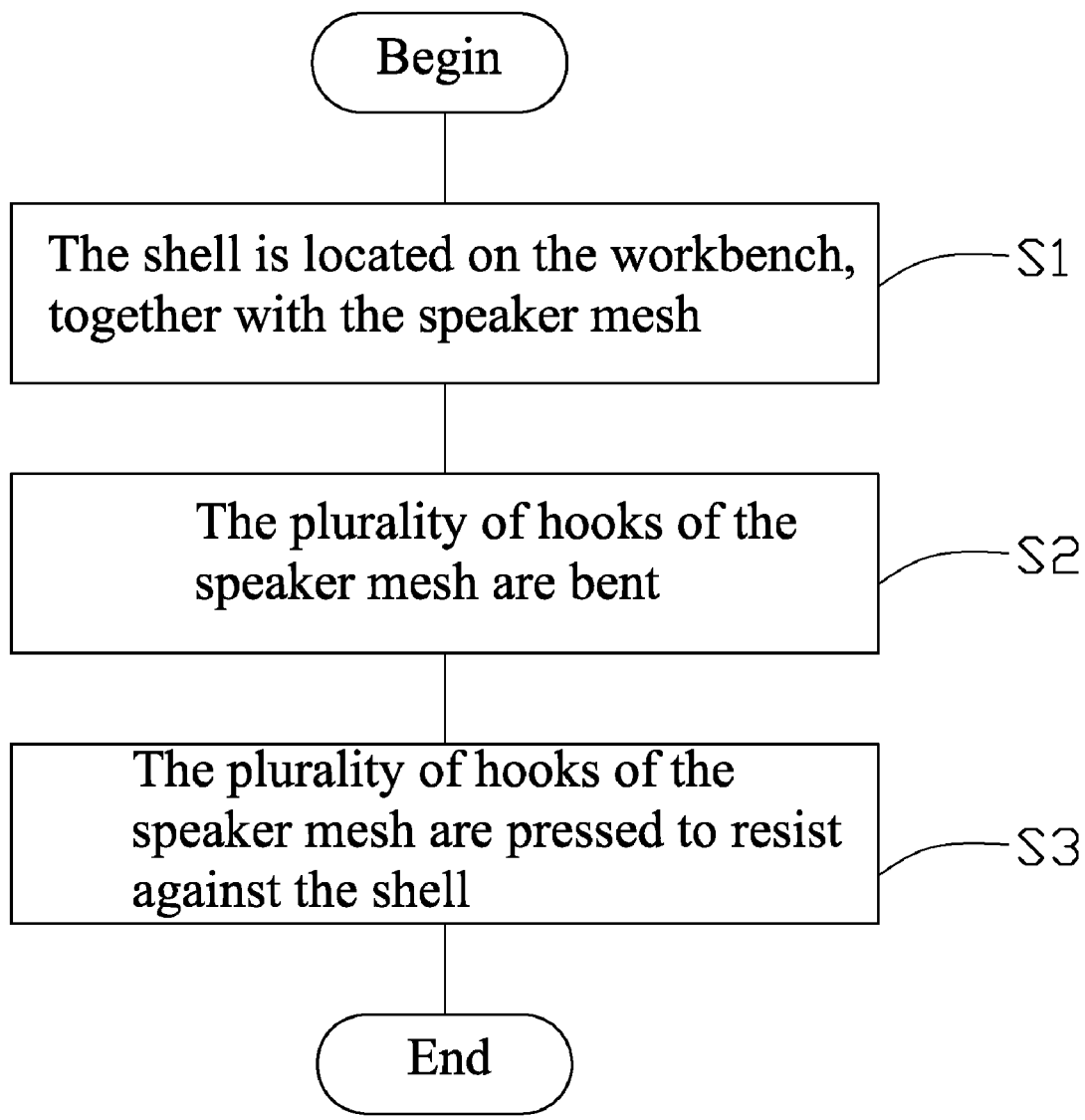
FIG. 2 is a flowchart of an exemplary embodiment of a pressing method utilizing the pressing apparatus of FIG. 1.
Figure 3:
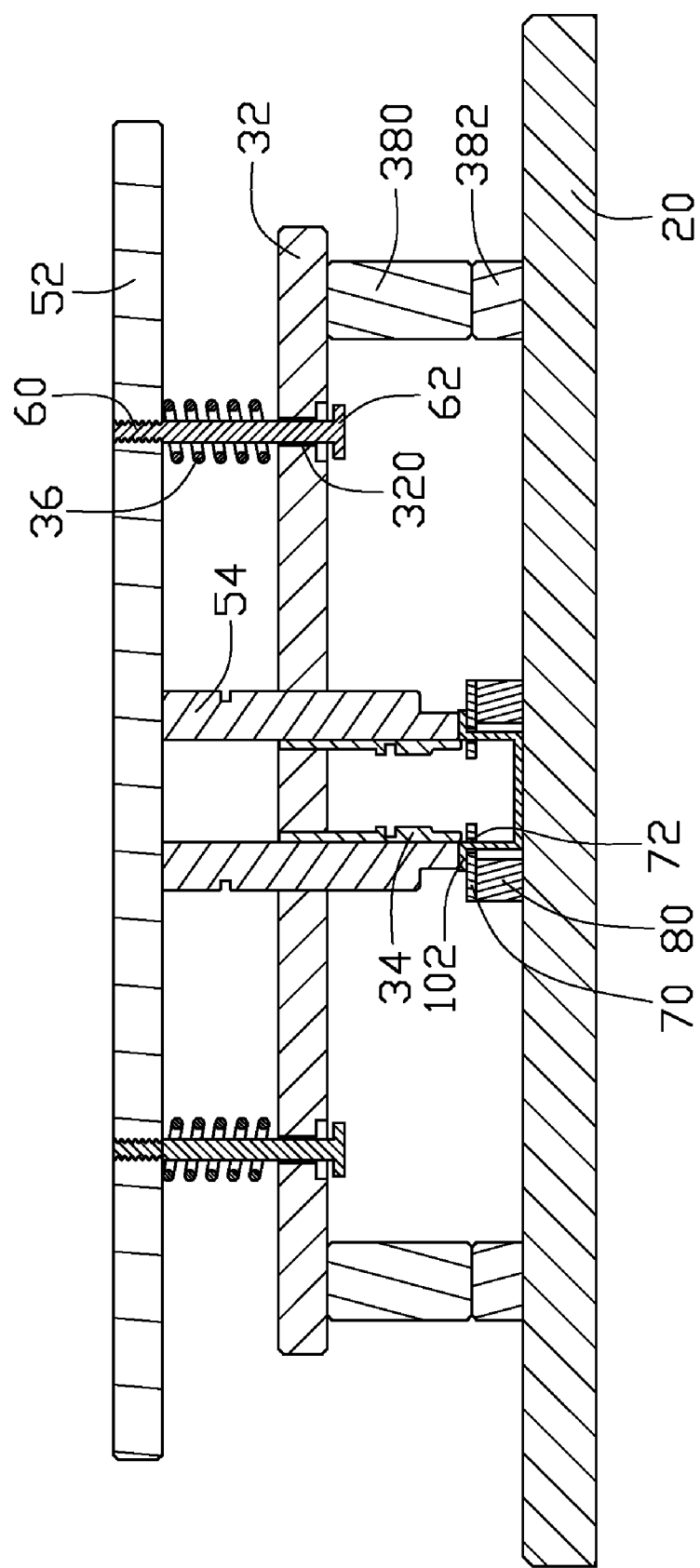
FIG. 3 is similar to FIG. 1, but showing a plurality of hooks of the speaker mesh having been perpendicularly bent to hold the shell.

Referring to FIGS. 1 to 3, a pressing method for pressing the plurality of hooks 102 of the speaker mesh 10 to perpendicularly bend to hold the shell 70 includes the following steps.

In step S1, the speaker mesh 10 is placed on the top surface of the workbench 20, and between two opposite ends of the positioning member 80. The shell 70 is placed on the positioning member 80, with the hooks 102 of the speaker mesh 10 passing through the corresponding clamping slots 72 of the shell 70.

In step S2, the second pressing board 52 is driven to move towards the workbench 20, together with the first pressing board 32, the bending members 34, the resisting posts 380, and the pressing members 54. The first pressing board 32 is stopped when the bending ends 340 of the bending members 34 contact the corresponding hooks 102. Therefore, the resilient members 36 are distorted to drive the first pressing board 32 to move towards the workbench 20 further, resulting in the second pressing board 52 also moving towards the workbench 20. The bending ends 340 of the bending members 34 press inner sides of distal ends of the hooks 102 to bend out. When the distal ends of the hooks 102 are bent to about 45 degrees relative to the workbench 20, the resisting posts 380 resist against the corresponding withstanding posts 382, therefore, the first pressing board 32 is stopped.

In step S3, the second pressing board 52 is driven towards the workbench 20 further, with the pressing surfaces 540 of the pressing members 54 pressing the distal ends of the bent hooks 102 to the shell 70. Therefore, the distal ends of the hooks 102 are bent 90 degrees to resist against the shell 70. In this process, the resilient members 36 are distorted. The head portions 62 of the connecting members 60 are moved out from the greater portions of the corresponding stepped holes 320. Subsequently, the second pressing board 52 is driven away from the workbench 20 to restore to an original state. Therefore, the resilient members 36 are gradually restored to original states, and the head portions 62 of the connecting portions 60 are slid into the greater portions of the corresponding stepped holes 320 again. As a result, the first pressing board 32 is moved with the second pressing board 52 away from the workbench 20.

It is believed that the present embodiments and their advantages will be understood from the foregoing description, and it will be apparent that various changes may be made thereto without departing from the spirit and scope of the description or sacrificing all of its material advantages, the examples hereinbefore described merely being exemplary embodiments.

What is claimed is:

1. A pressing apparatus for pressing a plurality of hooks of a speaker mesh to a shell, the pressing apparatus comprising:
    a workbench supporting the speaker mesh and the shell;
    a first pressing board located above the workbench;
    a plurality of bending members extending down from the first pressing board toward the workbench;
    a second pressing board located above the first pressing board opposite to the workbench; and
    a plurality of pressing members extending down from the second pressing board, wherein, each pressing member is slidably passed through the first pressing board and adjacent to a corresponding bending member;
    wherein the plurality of bending members press inner sides of distal ends of the hooks to bend the hooks out in response to the first pressing board moving towards the workbench; and the plurality of pressing members press the distal ends of the hooks to bend further to hold the shell in response to the second pressing board moving towards the workbench.

2. The pressing apparatus of claim 1, further comprising a plurality of connecting members, wherein the plurality of connecting members are slidably passed through the first pressing board to be engaged with the second pressing board.

3. The pressing apparatus of claim 2, further comprising a plurality of resilient members, wherein the plurality of resilient members are fitted about the corresponding connecting members, opposite ends of each resilient member resist against the first and second pressing boards, respectively.

4. The pressing apparatus of claim 1, wherein each bending member comprises a slanting bending end, slanting with respect to a longitudinal axis of the hooks before the hooks are bent, at a distal end of the bending member, to bend the hooks out.

5. The pressing apparatus of claim 4, wherein each bending end slants 45 degrees relative to the first pressing board.

6. The pressing apparatus of claim 1, wherein each pressing member comprises a flat pressing surface at a distal end of the respective pressing member below the first pressing board.

7. The pressing apparatus of claim 1, further comprising a limiting unit, wherein the limiting unit comprises a plurality of resisting posts extending down from the first pressing board, and a plurality of withstanding posts extending up from the workbench, each resisting post aligns with a corresponding withstanding post, to resist against the corresponding withstanding post to stop the first pressing board moving further after bending the hooks out.

* * * * *